UNITED STATES PATENT OFFICE.

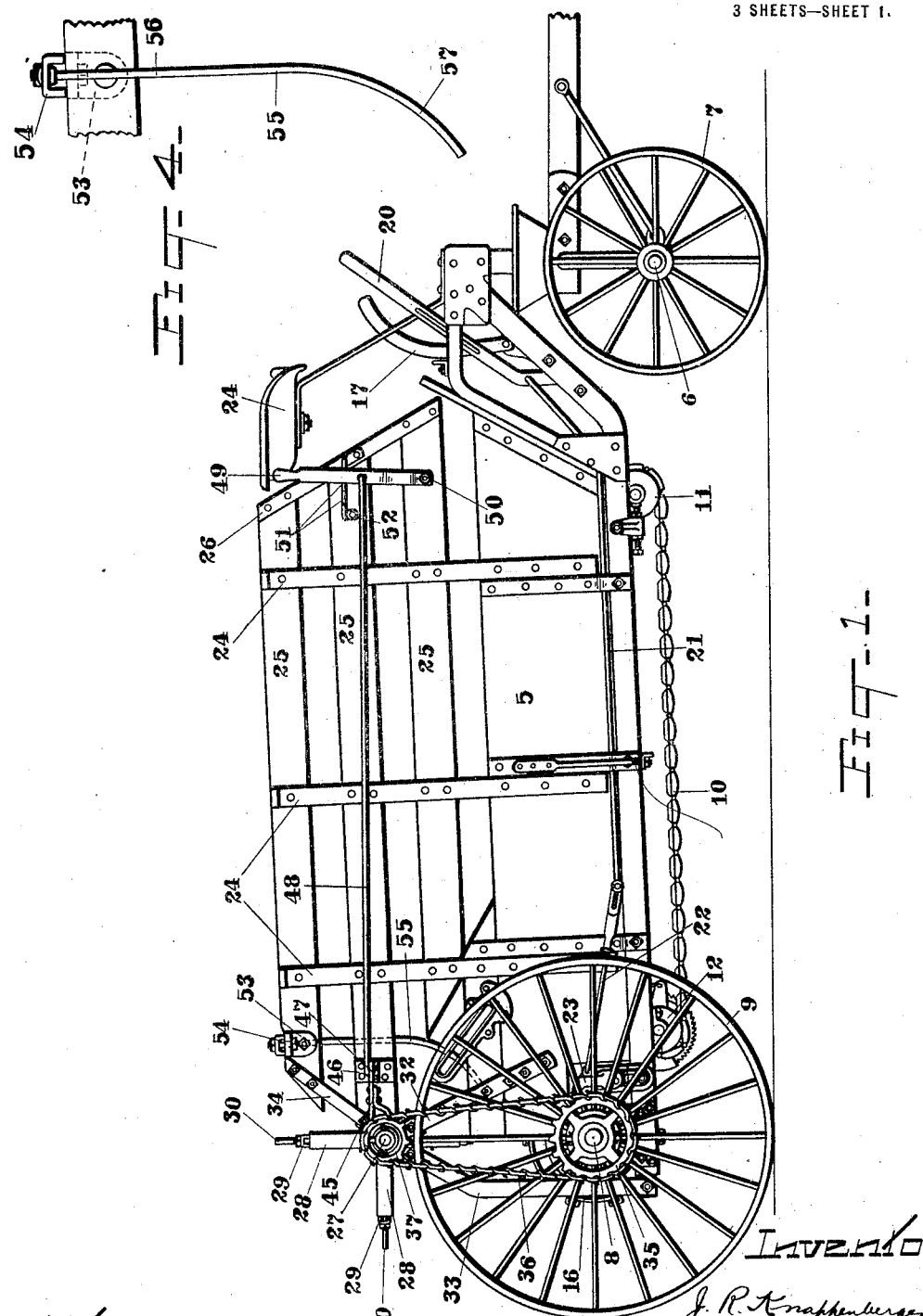

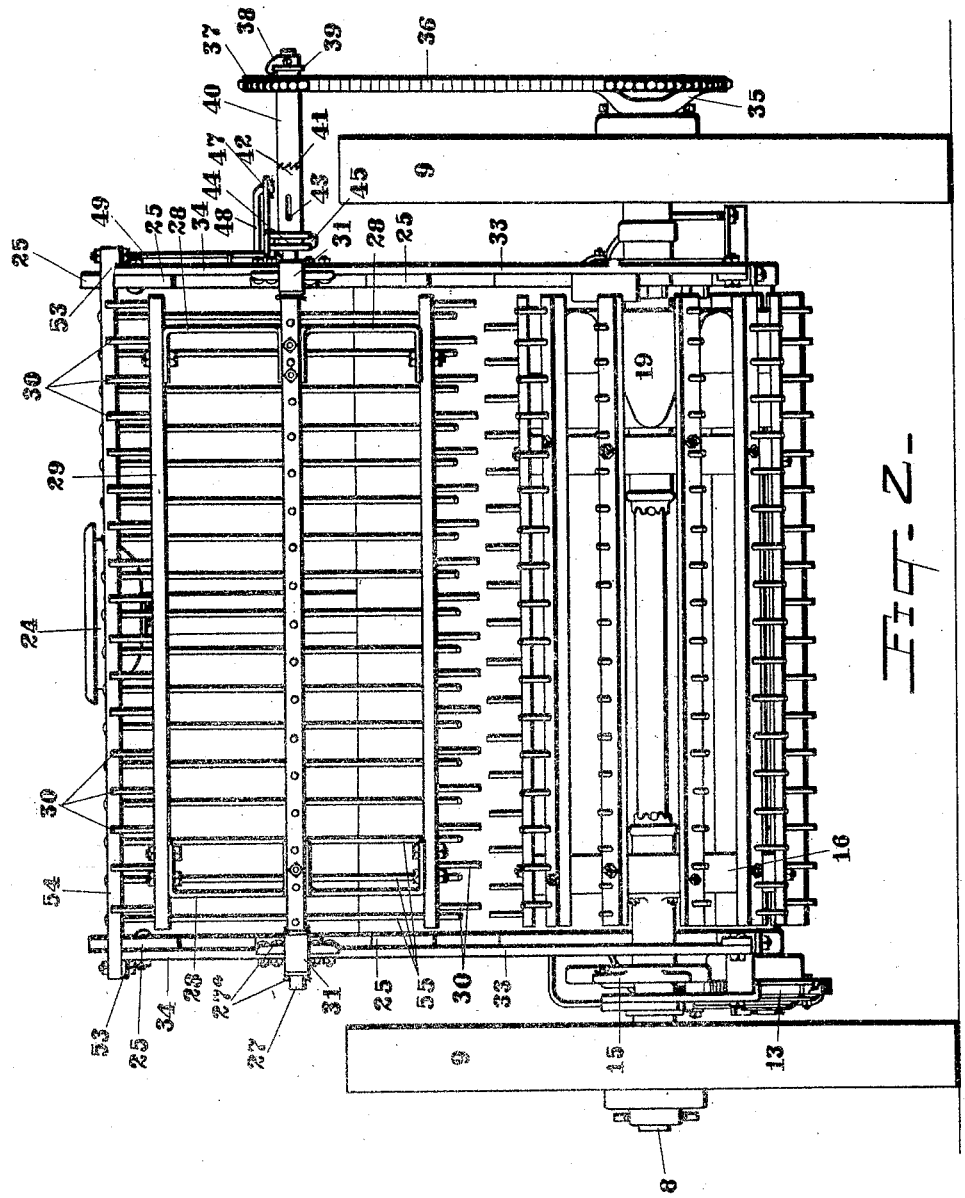

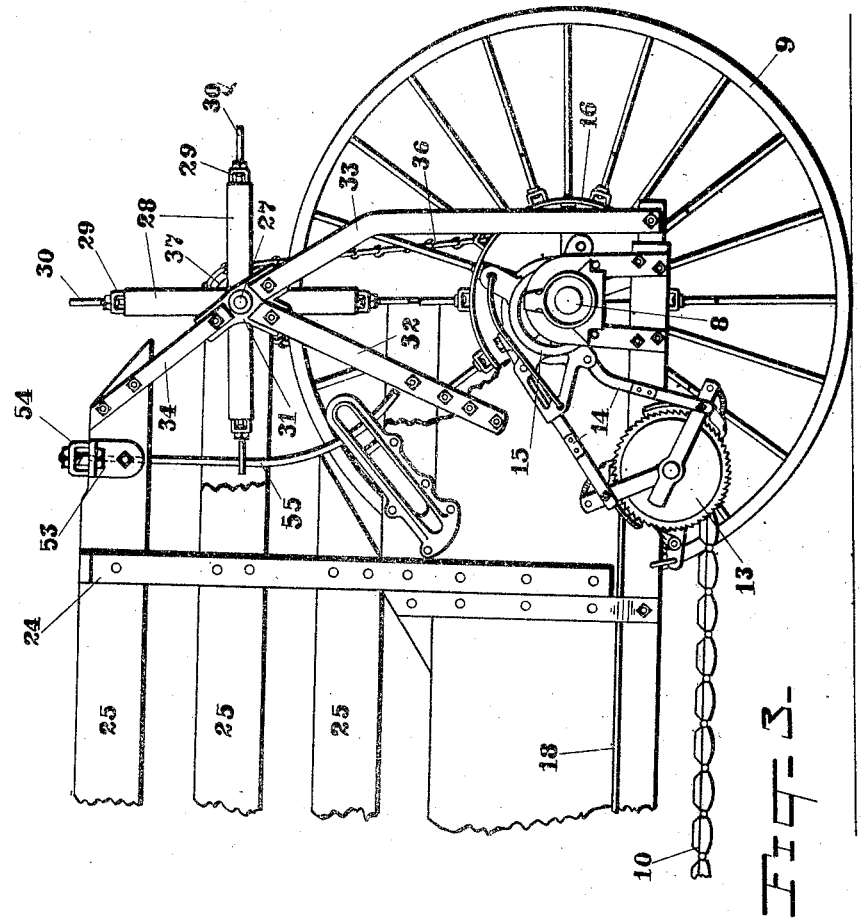

JACOB ROSS KNAPPENBERGER, OF PENALOSA, KANSAS, ASSIGNOR TO DEERE & COMPANY, OF MOLINE, ILLINOIS, A CORPORATION OF ILLINOIS.

SPREADING DEVICE.

1,368,165.  Specification of Letters Patent.  Patented Feb. 8, 1921.

Application filed April 24, 1918. Serial No. 230,521.

*To all whom it may concern:*

Be it known that I, JACOB ROSS KNAPPENBERGER, a citizen of the United States, residing at Penalosa, in the county of Kingman and State of Kansas, have invented certain new and useful Improvements in Spreading Devices, of which the following is a specification, reference being had therein to the accompanying drawing.

This invention relates to improvements in spreading devices and the purpose of the invention is to adapt a standard type of manure spreader of the kind ordinarily used for the distribution of heavy compact masses such as barn yard manure, to the spreading of straw.

One object of the invention is to provide means for temporarily increasing to a considerable extent the holding capacity of the usual spreader body, for straw, by reason of its light, bulky nature, especially when dry and particularly after being loosened by the handling or pitching incident to loading it into the load carrying body, takes up more room than barn yard manure, proportionately to the ground area each will cover when spread; and to provide a rotary toothed cylinder which will bring the straw from the end portion of the upper stratum of the deep straw mass down to the horizontal lines of the upper teeth and act in combination therewith in an advantageous way as concerns the delivery of the straw with uniformity to the ground.

Referring to the drawings, in which similar numerals indicate identical parts,

Figure 1 is a side elevation of a well known type of manure spreader embodying my straw spreading improvements.

Fig. 2 is a rear elevation thereof.

Fig. 3 is a side elevation partly in section of the side of the machine opposite that shown in Fig. 1, the traction wheel being removed and the front portion broken away.

Fig. 4 is a detail.

The manure spreader illustrated in the drawings and to which I have shown my invention as applied, is illustrated and specifically described in United States Patents Reissue Numbers 13,318 of Nov. 21, 1911 and 1,215,614 of Feb. 13, 1917 issued to Theophilus Brown, therefore I do not deem it necessary to here again describe in detail the structure and operation of the manure spreader proper. Suffice it to say that 5 indicates the load holding body which is supported at the front upon a dirigible axle 6 mounted in front wheels 7, and supported at the rear upon an axle 8 mounted in traction driving wheels 9, the latter wheels being ratchet clutched to the axle in a well known manner. 10 is the flexible traveling apron that forms the bottom for the body. 11 is the forward support for the apron, and 12 is the rear support and apron drive. As well understood the apron is carried intermediate the supports 11 and 12 upon rollers mounted on the body sills.

The upper run of the apron is caused to travel rearwardly, when the spreading cylinder 16 is in operation, by the ratchet mechanism indicated at 13 which is operated through links 14 from an eccentric 15 which is a part of the manure spreader cylinder 16. The ratchet feed mechanism can be put in and out of gear and its speed of actuation controlled by the operator, by means of the lever 17 which is connected to the ratchet feed mechanism by a shipper rod 18. The details of the apron ratchet feed mechanism is fully illustrated and described in the Brown Patent No. 1,215,614 previously referred to.

The spreader cylinder 16 is mounted upon the rear axle 8 and is driven therefrom to rotate at a relatively high speed by gear mechanism inclosed within the cylinder head 19. The details of the cylinder mounting upon the axle and its location relative to the body as well as the mechanism for rotating the cylinder from power furnished by the rear wheels 9, are fully illustrated and described in the Brown Patent Reissue No. 13,318 previously referred to.

20 is the operating lever, 21—22 the jointed shipper rod and 23 the dog for applying or releasing the power of the drive wheels 9 to the cylinder 16. The details of this construction can be seen in the Theophilus Brown Patent No. 1,226,746 of May 22, 1917, therefore it will not be further elaborated upon here.

The driver's seat at the front of the machine and situated conveniently to the levers for controlling the machine is indicated at 24.

The parts just described go to make up a standard machine especially adapted to the distribution of barn yard manure, or other fertilizing material of a heavy sodden nature. As, however, it is desirable to spread back upon the field the straw that has been harvested therefrom, after threshing, and as the machine just described has but a limited capacity for holding a light bulky product such as straw, and the use of such a machine for spreading straw would involve making additional trips to and from the field because of the limited quantity that can be hauled at one time, and to make practicable for such use, the machine already on hand for spreading manure, I have provided for materially enlarging the load carrying space.

This is accomplished by the use of additional body sides formed of uprights 24, which at their lower ends are secured to the manure spreader body 5. To the uprights 24 are secured longitudinally extending slats 25 which may be spaced apart in the interest of lightness. The front ends of the slats are braced together by an upright 26. This provides a deep load carrying receptacle, and all the weight of the load mass will rest upon the movable apron 10, and therefore when the cylinder 16 is in operation and the ratchet feed mechanism 13 is put in action the load will be moved toward the rear. As the cylinder 16, if used alone for distributing the load, would undermine the upper stratum of the load mass, and cause the overhanging portion to break or be torn off in bunches and thrown out as such, which would result in uneven distribution of the product, I employ a supplemental, relatively slowly rotating cylinder situated above the cylinder 16. The purpose of the upper cylinder is to engage with the straws of the end portion of the upper stratum of the deep load mass, stop their backward motion and cause them to move downward to the horizontal planes of the upper teeth of the lower cylinder. An approximately uniform web-like mass of relatively compacted straws is thus formed between the two cylinders. The supplemental or upper cylinder comprises a cross shaft 27 to which is secured near each side of the body, sets of radiating arms 28 that form spiders for supporting the tooth bars 29, the latter paralleling the cross shaft. Teeth 30 similar to the teeth carried by the lower cylinder are secured to the bars 29 at close intervals throughout their length.

The circles of rotation of the teeth 30 are close to the circles of rotation of the teeth on the lower cylinder. The web-like mass above referred to, formed by the upper teeth moving the straws downward to the horizontal planes of the upper teeth of the lower cylinder, is allowed to move backward, but its component straws are prevented from escaping in clots or lumpy masses. The teeth of the lower cylinder rapidly shred or tear off the straws in uniform quantities from the web so formed and spread them uniformly, the upper cylinder assisting the lower one in the backward propulsion of the straw, but relatively retarding the advance of the compressed mass to insure the uniform distribution of the straws by the more rapidly rotating lower cylinder.

The cross shaft 27 of the supplemental cylinder is revolubly mounted in bracket bearings 31, fastened to the center slat 25 of the body sides and supported from the rear portion of the body 5 by uprights 32—33. Braces 34 connected with the brackets 31 and secured to the top slat of the body sides further steady the mounting for the supplemental cylinder. The shaft 27 and its parts, is held from slipping endwise through its bearings 31 by keys 27ª passed through the shaft at each end of the bearings 31. The supplemental cylinder is rotated by power from the axle 8. A sprocket 35 is secured to the end of the axle and is connected by link belting 36 with a sprocket 37 journaled upon an extended end of the cross shaft 27. The latter sprocket is held from movement endwise of the shaft by a hook like lug 38, secured to the end of the shaft, which engages a collar 39 formed on the outer portion of the sprocket hub. The inner portion of the sprocket hub 40 forms one element of a jaw clutch 41, the other element of the jaw clutch being formed by a sleeve 42 which is secured to the shaft 27 to rotate therewith but may have movement endwise thereof by the well known pin and slot construction, indicated at 43. 44 is a channeled collar formed on the sleeve 42 and with which a shifter fork 45 engages for moving the sleeve to open or close the jaw clutch. The shifter fork is pivoted upon a bracket 46 secured to one of the slats 25 and has an outwardly extended arm 47, the outer end of which is connected by a shipper rod 48 with a hand lever 49, pivoted at 50 to a body slat 25, the lever engaging with notches 51 formed in a sector 52, fastened to the slat 25, which holds the clutch open or closed dependent upon the position the lever is placed in by the driver.

Brackets 53, secured to the outer faces of the top slat 25 of the body sides, support a transversely mounted bar 54 to which is fastened guide fingers 55 that project down into the body space in advance of the supplemental beater. These guides 55 are spaced apart approximately the same distance that the teeth of the supplemental cylinder are spaced apart and the guides are so arranged with respect to longitudinal vertical planes of the body, that they are offset relative to the cylinder teeth. The guide fingers 55 have an upper straight portion 56 and a lower rearwardly curved portion 57, the transverse bar 54 being positioned forwardly of the axis of the supplemental cylinder a distance to locate the lower curved ends of the guide fingers in the planes, transversely of the body, that are traversed by the teeth 30, as the supplemental cylinder rotates. The guide fingers are formed of resilient metal so their lower free ends can yield or spring back slightly under pressure which results in the exposure, forwardly of the guides, of a correspondingly additional effective length of each tooth 30, which will act to convey more of the upper stratas of the load mass to the lower cylinder until the pressure is overcome. The lower or free ends of the guides 55 terminate above or outside of the paths traversed by the teeth of the cylinder 16, and it will be understood that their purpose is to coöperate with the revolving teeth 30 of the supplemental cylinder to convey and guide to the teeth of the distributing cylinder, steadily and evenly, the material from the upper stratas of a light, bulky load mass.

When the load carrying receptacle has been filled and the machine driven to the point where the load is to be spread, the operator shifts the lever 20 which sets in motion the distributing cylinder 16 which revolves rearwardly at its top side. The levers 49 and 17 are then shifted, the former to close the clutch 41 and set in motion the supplemental cylinder, which revolves rearwardly at its bottom side, and the latter to put in action the ratchet mechanism 13 that moves the apron 10 rearward and feeds the load at the desired rate against the cylinders, the upper one of which—the supplemental cylinder—with the aid of the guide fingers 55 carries the upper portion of the load mass downwardly where it is engaged by the distributing cylinder 16, and delivered evenly at the rear along with the material that the distributing cylinder shreds directly from the lower portion of the load mass.

What I claim is—

1. A straw spreading mechanism having in combination a wheel-supported load-carrying body formed with side walls extending relatively widely upward to provide a deep chamber for a large mass of loose straws, a lower rapidly rotatable toothed distributing cylinder arranged at the rear end of the body to carry straws upward from the bottom stratum of the straw mass and then backward over its axis, and an oppositely rotating toothed cylinder directly above the cylinder aforesaid and adapted to engage with the straws of the rear portion of the upper stratum of the straw mass and move them down to the horizontal planes of the upper teeth of the lower cylinder, the cylinders being relatively arranged to form an approximately uniform web-like mass of straw and propel it backward and then disintegrate it and distribute the straws uniformly as the machine advances.

2. A straw spreading mechanism having in combination a wheel-supported load-carrying body formed with side walls extending relatively widely upward to provide a deep chamber for a large mass of loose straws, a lower rapidly rotatable toothed distributing cylinder arranged at the rear end of the body and positioned in the horizontal lines of the lower stratum of the straw mass, and a toothed cylinder directly above the lower cylinder and rotating in the opposite direction with relatively slower speed and adapted to engage with the straws of the rear portion of the upper stratum of the straw mass and move them downward to the horizontal planes of the upper teeth of the lower cylinder and form an approximately uniform web-like mass, said upper cylinder being adapted to move said web-like mass backward over the axis of the lower cylinder but with retardation relatively to the faster moving teeth of the lower cylinder.

3. A straw spreader having in combination a wheel-supported load-carrying body formed with side walls extended relatively widely upward to provide a deep chamber for a large mass of loose straw, a lower rapidly rotatable toothed distributing cylinder arranged at the rear end of the body and positioned in the horizontal lines of the lower stratum of the straw mass, an oppositely rotating toothed cylinder directly above the lower cylinder and arranged to engage with the straws of the rear portion of the upper stratum of the straw mass and move them downward to form a substantially uniform web-like mass in the horizontal planes of the upper teeth of the lower cylinder, and a transverse series of downwardly projecting stationary guard fingers supported in the upper part of the body in advance of the upper cylinder and having their lower ends curved to be approximately parallel to the paths of the teeth of the cylinder and arranged to permit said teeth to project beyond the fingers and engage with and carry straws downward to the horizontal planes of the said web-like mass.

4. For use with a manure spreader which has a load-carrying body and a cylinder in its rear end for distributing heavy manure, a straw spreading attachment comprising, first, side walls adapted to be secured to and extend relatively widely upward the side walls of said body, second, a rotary toothed cylinder between the rear end parts of the walls of the attachment and located, when in operation, directly above the cylinder of the manure spreader and, third, means for rotating the upper cylinder oppositely to the rotation of the lower cylinder and with slower speed and with its teeth traveling close to the teeth of the lower cylinder, the upper cylinder being arranged to carry straws downward from the rear part of the upper stratum of the straw mass to the horizontal planes of the upper teeth of the lower cylinder and form a substantially uniform web-like straw mass and assist in propelling it with relative retardation backward over the axis of the lower cylinder.

J. ROSS KNAPPENBERGER.